(12) United States Patent
Amirkhany et al.

(10) Patent No.: US 9,571,311 B2
(45) Date of Patent: Feb. 14, 2017

(54) ADAPTIVE CYCLIC OFFSET CANCELLATION FOR THE RECEIVER FRONT-END OF HIGH-SPEED SERIAL LINKS

(71) Applicant: SAMSUNG DISPLAY CO., LTD., Yongin, Gyeonggi-Do (KR)

(72) Inventors: Amir Amirkhany, Sunnyvale, CA (US); Sabarish Sankaranarayanan, Mountain View, CA (US)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 14/944,143

(22) Filed: Nov. 17, 2015

(65) Prior Publication Data

US 2016/0149732 A1    May 26, 2016

Related U.S. Application Data

(60) Provisional application No. 62/085,121, filed on Nov. 26, 2014.

(51) Int. Cl.
*H03K 5/159* (2006.01)
*H04L 25/06* (2006.01)
*H04L 27/00* (2006.01)
*H04L 25/03* (2006.01)
*H04L 25/02* (2006.01)

(52) U.S. Cl.
CPC ......... *H04L 25/061* (2013.01); *H04L 25/0292* (2013.01); *H04L 25/03057* (2013.01); *H04L 27/0002* (2013.01); *H04L 25/028* (2013.01)

(58) Field of Classification Search
CPC ............. H04L 25/03885; H04L 7/0337; H04L 2025/03503
USPC ................... 375/233, 232, 229; 708/322, 323
See application file for complete search history.

(56) References Cited

U.S. PATENT DOCUMENTS

| | | | |
|---|---|---|---|
| 8,135,100 B2 | 3/2012 | Beukema et al. | |
| 8,649,476 B2 | 2/2014 | Malipatil et al. | |
| 8,837,570 B2 | 9/2014 | Shvydun et al. | |
| 8,842,767 B2 | 9/2014 | Esmailian et al. | |
| 8,879,618 B2 | 11/2014 | Abdalla et al. | |
| 8,934,525 B2 | 1/2015 | Lee et al. | |
| 8,964,827 B2 | 2/2015 | Zhong | |
| 2012/0207196 A1* | 8/2012 | Zerbe | H04L 1/0026 375/219 |

(Continued)

OTHER PUBLICATIONS

Aleong; A Technique for Combining Equalization with Differential Detection; Department of Electrical Engineering; McGill University, Montreal; 120 Pages, © Jun. 1991.

(Continued)

*Primary Examiner* — Khai Tran
(74) *Attorney, Agent, or Firm* — Lewis Roca Rothgerber Christie LLP

(57) ABSTRACT

A receiver for a serial link. The receiver has an analog input configured to receive a received signal and includes a first front end comprising a first sampler configured to sample a signal at an input of the first front end, and a first correction circuit configured to add a first correction to the signal at the input of the first front end, the first correction including a first offset correction. The offset correction is updated by a modified sign-sign least mean squares method.

20 Claims, 6 Drawing Sheets

(56) References Cited

U.S. PATENT DOCUMENTS

2012/0269305 A1* 10/2012 Hogeboom .......... H04L 25/069
375/346
2014/0269881 A1 9/2014 He et al.

OTHER PUBLICATIONS

Song et al.; A 6.25 Gb/s Voltage-Time Conversion Based Fractionally Spaced Linear Receive Equalizer for Mesochronous High-Speed Links; IEEE Journal of Solid-State Circuits; May 2011; pp. 1183-1197; vol. 46, No. 5, IEEE.

* cited by examiner

ADAPTIVE CYCLIC OFFSET CANCELLATION FOR THE RECEIVER FRONT-END OF HIGH-SPEED SERIAL LINKS

CROSS-REFERENCE TO RELATED APPLICATIONS

The present application claims priority to and the benefit of U.S. Provisional Application No. 62/085,121, filed Nov. 26, 2014, entitled "ADAPTIVE CYCLE OFFSET CANCELLATION FOR THE RECEIVER FRONT-END OF HIGH-SPEED SERIAL LINKS", the entire content of which is incorporated herein by reference.

FIELD

One or more aspects of embodiments according to the present invention relate to serial data transmission, and more particularly to a system for correcting DC offsets in a serial link.

BACKGROUND

In high-speed electrical links, the transmitter's internal high-speed clock may leak (e.g., couple) to the transmit signal. The magnitude of the coupled clock may be as high as 5-10% of the transmit swing. The coupled clock signal may have a fundamental tone at the bit-rate frequency (since one edge may be used for every bit), and may have sub-harmonics at one half or one quarter of the bit-rate frequency. The coupled clock may reduce the signal to interference ratio at the receiver input and may increase bit-error ratio.

A serial link receiver may include DC offset cancellation circuits that may increase a receiver front end's sensitivity by canceling any DC offset caused by transistor mismatch or other sources. Offset cancellation may be done by shorting the P and N inputs of the differential input of the receiver and adjusting the offset so that the output of the analog front end (or "front-end") is balanced around zero. In some cases, the bit-rate clock superimposed on the received signal may appear as a DC offset to the receiver samplers, because a sinusoid with frequency $f_0$ sampled by a clock at rate $f_0$ may appear as DC. As a result, it may be possible to cancel the effect of a coupled clock by utilizing the same circuits as those used for DC offset cancellation. To accomplish this, however, it may be necessary to cancel the total effective offset while the signal is transmitted from the transmitter to the receiver, and to de-couple the effect of the coupled clock from the transmit signal so that it may be measured and cancelled. This may be inconvenient, costly, or difficult to accomplish effectively.

Thus, there is a need for a system and method for the cancellation of coupled clock signals.

SUMMARY

According to an embodiment of the present invention there is provided a receiver for a serial link, the receiver having an analog input configured to receive a received signal and including: a first front end including a first sampler configured to sample a signal at an input of the first front end; a first correction circuit configured to add a first correction to the signal at the input of the first front end, the first correction including a first offset correction; and a processing unit configured to calculate the first offset correction, the calculating including iteratively updating a first parameter vector including the first offset correction, the updating including adding to the first parameter vector a first adjustment equal to the product of: a constant step size; a first function of a data vector; and a second function of a first error value; the data vector including: a plurality of previously received bits, and the value 1; the first error value being equal to the difference between the received signal and a first reconstructed signal, the first reconstructed signal being a sum of an element by element product of: the data vector, and the first parameter vector.

In one embodiment, the data vector includes the value 1 at a position corresponding to the position in the first parameter vector of the first offset correction.

In one embodiment, the first function is a sign function, and the second function is a sign function.

In one embodiment, the first function is an identity function, and the second function is a sign function.

In one embodiment, the first function is a sign function, and the second function is an identity function.

In one embodiment, the correction further includes a decision feedback equalizer (DFE) signal.

In one embodiment, the DFE signal includes a sum of an element by element product of: a vector of previously received bits and a vector of DFE taps.

In one embodiment, the receiver includes: a second front end including a second sampler configured to sample a signal at an input of the second front end; and a second correction circuit configured to add a second correction to the signal at the input of the second front end, the second correction including a second offset correction, wherein the processing unit is further configured to calculate the second offset correction, the calculating including iteratively updating a second parameter vector including the second offset correction, the updating including adding to the second parameter vector a second adjustment equal to the product of: the constant step size; a first function of the data vector; and a second function of a second error value; the second error value being equal to the difference between the received signal and a second reconstructed signal, the second reconstructed signal being a sum of an element by element product of: the data vector, and the second parameter vector.

In one embodiment, the data vector includes the value 1 at a position corresponding to the position in the first parameter vector of the first offset correction.

In one embodiment, the first function is a sign function, and the second function is a sign function.

In one embodiment, the first function is an identity function, and the second function is a sign function.

In one embodiment, the first function is a sign function, and the second function is an identity function.

In one embodiment, the correction further includes a decision feedback equalizer (DFE) signal.

In one embodiment, the DFE signal includes the sum of an element by element product of: a vector of previously received bits, and a vector of DFE taps.

According to an embodiment of the present invention there is provided a display including: a timing controller including a serial transmitter; and a driver integrated circuit including a serial receiver connected to the serial transmitter by a serial channel, the receiver having an analog input configured to receive a received signal and including: a first front end including a first sampler configured to sample a signal at an input of the first front end; a first correction circuit configured to add a first correction to the signal at the input of the first front end, the first correction including a first offset correction; and a processing unit configured to calculate the first offset correction, the calculating including iteratively updating a first parameter vector including the first offset correction, the updating including adding to the first parameter vector a first adjustment equal to a product of: a constant step size; a first function of a data vector; and a second function of a first error value; the data vector including: a plurality of previously received bits, and the value 1; the first error value being equal to the difference between the received signal and a first reconstructed signal, the first reconstructed signal being a sum of an element by element product of: the data vector, and the first parameter vector.

In one embodiment, the data vector includes the value 1 at a position corresponding to the position in the first parameter vector of the first offset correction.

In one embodiment, the first function is a sign function, and the second function is a sign function.

In one embodiment, the correction further includes a decision feedback equalizer (DFE) signal.

In one embodiment, the correction further includes a decision feedback equalizer (DFE) signal, and wherein the DFE signal includes the sum of an element by element product of: a vector of previously received bits, and a vector of DFE taps.

According to an embodiment of the present invention there is provided a display including: a timing controller including a serial transmitter; and a driver integrated circuit including a serial receiver connected to the serial transmitter by a serial channel, the receiver having an analog input configured to receive a received signal and including: a first front end including a first sampler configured to sample a signal at an input of the first front end; a first correction circuit configured to add a first correction to the signal at the input of the first front end, the first correction including a first offset correction; and means for calculating the first offset correction, the calculating including iteratively updating a first parameter vector including the first offset correction, the updating including adding to the first parameter vector a first adjustment equal to a product of: a constant step size; a first function of a data vector; and a second function of a first error value; the data vector including: a plurality of previously received bits, and the value 1; the first error value being equal to the difference between the received signal and a first reconstructed signal, the first reconstructed signal being a sum of an element by element product of: the data vector, and the first parameter vector.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a system and method for adaptive cyclic offset cancellation for the receiver front-end of high-speed serial links provided in accordance with the present invention and is not intended to represent the only forms in which the present invention may be constructed or utilized. The description, sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

A serial link for transmitting data may include a serial transmitter, a serial receiver, and a channel connecting the transmitter and the receiver. The serial link receiver may include decision feed-back (DFE) equalization circuits to cancel the effect of inter-symbol interference (ISI) introduced by the channel. Such a system may also include a sign-sign least mean square (LMS)-based adaptation algorithm through which the DFE tap values are adapted for accurate ISI cancellation.

Figure 1:
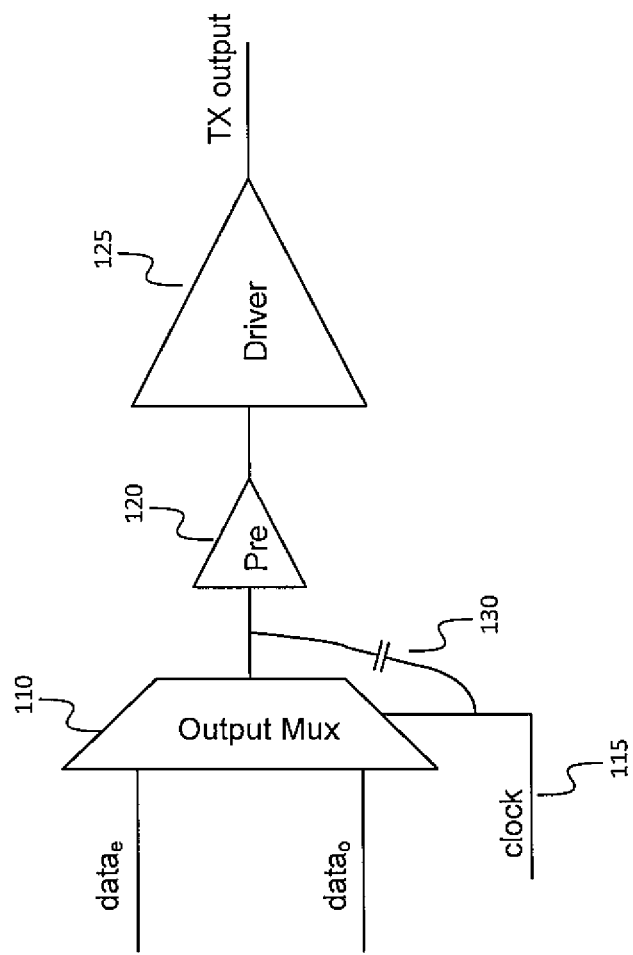
FIG. 1 is a schematic diagram of a serial transmitter with a clock signal coupled to the transmit signal, according to an embodiment of the present invention.

Referring to FIG. 1, in one embodiment the serial transmitter includes an output multiplexer (Mux) 110 with a select input controlled by a clock signal 115. The output multiplexer 110 drives a pre-driver 120 that in turn drives a driver 125 that drives the transmitter output. Stray capacitance 130 may result in coupling between, e.g., the clock signal 115 and the output of the output multiplexer 110, resulting in an output signal from the serial transmitter that includes a superposition of the data signal and the coupled clock signal.

Figure 2:
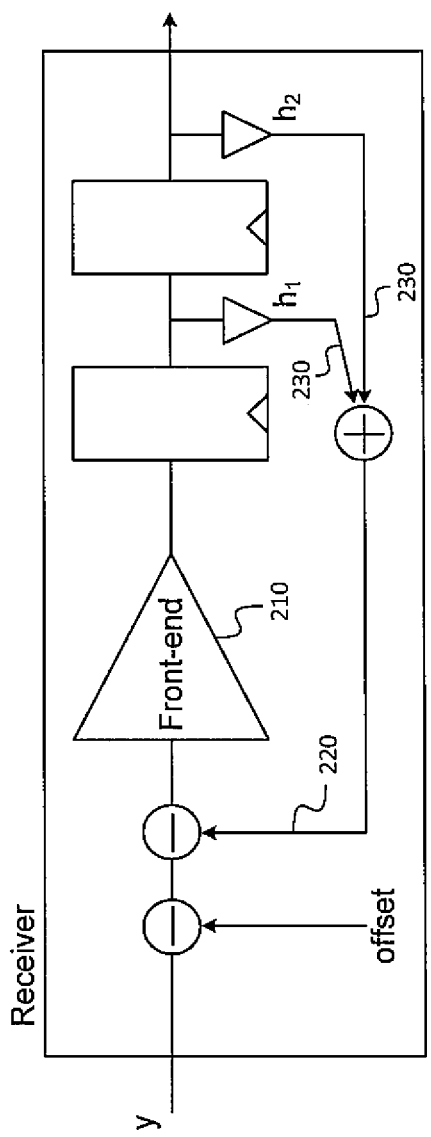
FIG. 2 is a schematic diagram of a serial receiver with offset correction and decision feedback equalization (DFE), according to an embodiment of the present invention.

FIG. 2 shows a conceptual model of a receiver with offset cancellation and DFE. The analog input to the receiver (labeled "y" in FIG. 2) has subtracted from it an offset correction to cancel any DC offsets in the system (including any in the analog front end 210, and any due to clock coupling), and a DFE signal 220 that is the sum of a plurality of DFE correction terms 230, each correction term being the product of a DFE tap and a previously received bit value.

Figure 3:
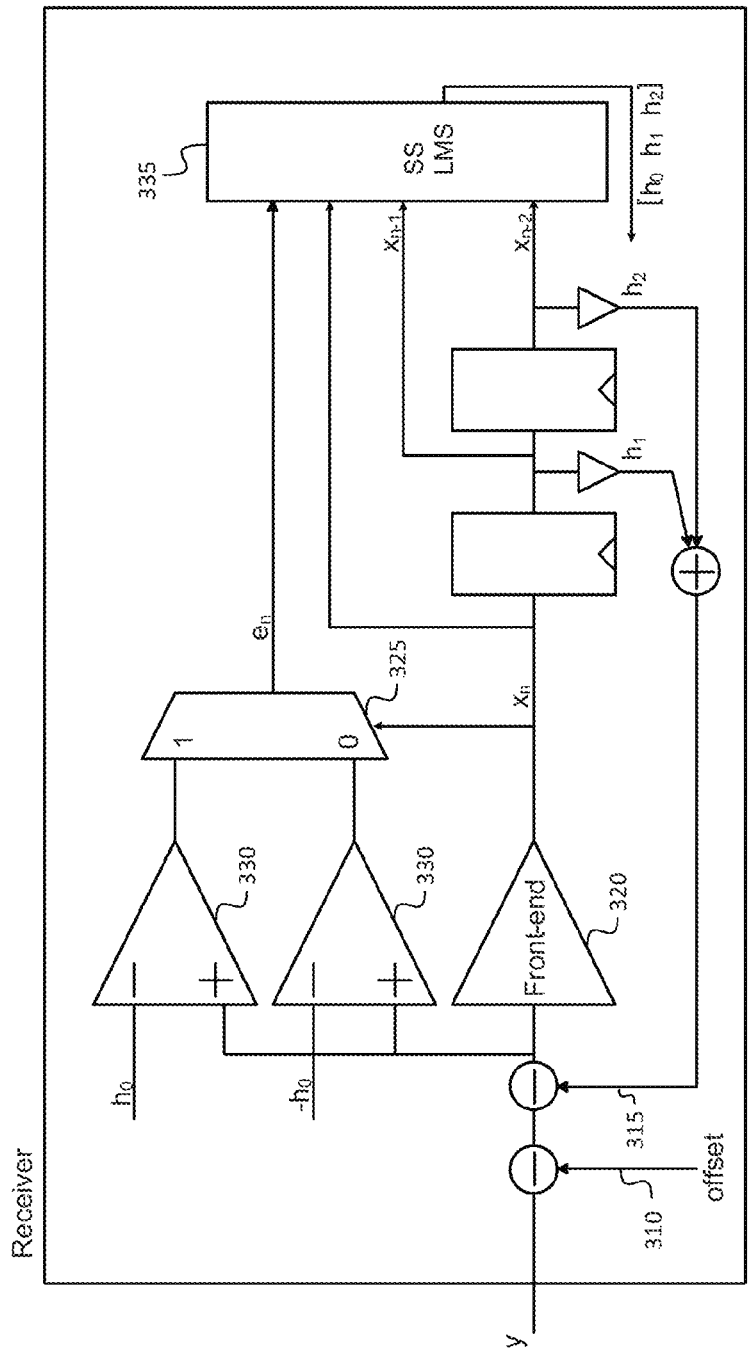
FIG. 3 is a schematic diagram of a serial receiver with offset correction, DFE, and adaptive adjustment of DFE taps, according to an embodiment of the present invention.

Referring to FIG. 3, in one conceptual implementation, a receiver with DFE may employ a method referred to as sign-sign LMS adaptation. The operation of this circuit may be illuminated by the following derivation.

For a channel that may be adequately modeled as having three significant taps, the received signal at the receiver may be described as $$y_n = [x_n x_{n-1} x_{n-2}] \otimes [h_0 h_1 h_2] + \cos(2*pi*f_0*nT+\Phi) + \text{noise} \quad (1)$$

where:
y is the received signal,
n is an index of time,
$h_0$, $h_1$, $h_2$ are the signal channel taps
$\cos(2*pi*f_0*nT+\Phi)$ is the clock signal coupled to the channel from the transmitter with frequency $f_0$, T is the bit-period, Φ is an arbitrary phase, that may be unknown, and "noise" is additive noise.

The operator ⊗ forms the sum of the element by element product of the two vector arguments:

$$[x_n x_{n-1} x_{n-2}] \otimes [h_0 h_1 h_2] = x_n * h_0 + x_{n-1} * h_1 + x_{n-2} * h_2.$$

The ⊗ operator may be referred to herein as a dot product operator.

When $f_0=1/T$ (i.e., when the coupled clock signal has a frequency equal to the bit rate), $\cos(2*pi*f_0*nT+\Phi) = \cos(\Phi) = b$, where b is a constant. As a result, $$y_r' = [x_n x_{n-1} x_{n-2}] \otimes [h_0 h_1 h_2] + b + \text{noise} \quad (2)$$

A related art sign-sign LMS algorithm for adaptation is as follows:

$$[h_0 h_1 h_2]\hat{}_k = [h_0 h_1 h_2]\hat{}_{k-1} + \mu * \text{sign}([x_n x_{n-1} x_{n-2}]) * \text{sign}(\text{error}_n) \quad (3)$$

where the caret ("ˆ") denotes an estimate, e.g., $[h_0 h_1 h_2]\hat{}_k$ is the vector of estimated tap values at the $k^{th}$ iteration, μ is a constant step size, and "$\text{error}_n$" is the difference between the received signal $y_n$ and the reconstructed signal $[x_n x_{n-1} x_{n-2}] \otimes [h_0 h_1 h_2]\hat{}_{k-1}$. Carets are omitted from the drawings for brevity.

Other LMS algorithms may be used instead of sign-sign LMS, e.g., LMS, sign-data LMS, or sign-error LMS, for which, in Equation (3), $[x_n x_{n-1} x_{n-2}]$ may be used in place of $\text{sign}([x_n x_{n-1} x_{n-2}])$, and/or $\text{error}_n$ may be used in place of $\text{sign}(\text{error}_n)$. In general, the adaptation algorithm may involve, adding, at each iteration, an adjustment to a parameter vector (e.g., a vector of estimated channel taps $[h_0 h_1 h_2]\hat{}_{k-1}$), to form an updated parameter vector (e.g., $[h_0 h_1 h_2]\hat{}_k$), where the adjustment may be the product of the constant step size, a first function of the data vector (the data vector being, e.g., $[x_n x_{n-1} x_{n-2}]$), and a second function of the error, and where the first and second functions may each be, e.g., an identity function (that returns its argument unchanged) or a sign function (that returns the sign of its argument).

In the embodiment of FIG. 3, a correction circuit adds a correction to the input signal y (or, equivalently, subtracts an opposite correction signal from the input signal y). The correction may include an offset correction 310, and a DFE signal 315 to mitigate ISI. The analog front end 320 includes a sampler (or "slicer" or "clocked comparator"). The sign $e_n$ of the error term $\text{error}_n$ (i.e., $e_n = \text{sign}(\text{error}_n)$) is formed at the output of the multiplexer 325 as a result of the subtraction from the input y of the DFE signal $$x_{n-1} * h_1\hat{} + x_{n-2} * h_2\hat{},$$

and as a result of the subsequent subtraction, or addition, in two respective comparators 330, of $h_0$; the sign of the $h_0$ term is then controlled by the select input of the multiplexer 325, which is controlled by the value of $x_n$ at the output of the front end. The estimate $h_0\hat{}$ of the $0^{th}$ channel tap, and the post-cursor DFE taps $h_1\hat{}$, and $h_2\hat{}$ are iteratively updated by a processing unit 335 executing a sign-sign least mean squares (SS LMS) algorithm.

Figure 4:
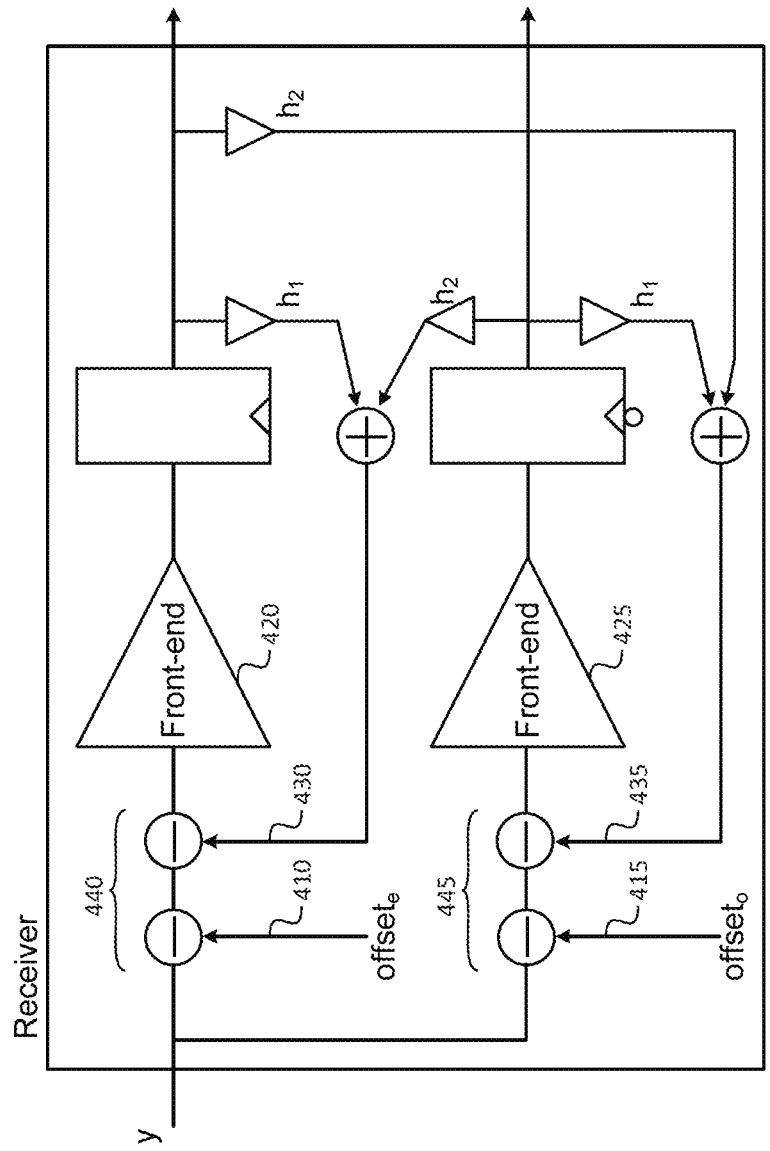
FIG. 4 is a schematic diagram of a double data rate (DDR) serial receiver with offset correction and decision feedback equalization (DFE), according to an embodiment of the present invention.

In some systems, a two-way parallelized serial transmitter, which may also be referred to as a double data rate (DDR) transmitter, or a quad data rate (QDR) transmitter, may be used. The corresponding receiver may then be referred to as a DDR or QDR receiver, respectively. In a DDR transmitter, the transmitter's internal clock frequency is one half of the bit rate, and the coupled clock may have components at half-bit-rate frequency. FIG. 4 shows a conceptual diagram of a two-way parallelized (DDR) receiver. Such a receiver may have independent DC offset correction signals 410, 415 for the even sampler (or front end) 420 and the odd sampler 425, respectively. One of two respective DFE signals 430, 435 may also be used to correct for ISI at the input to each sampler. In FIG. 4, a first correction circuit 440 connected to the even sampler 420 adds a first DC offset correction signal 410 and a first DFE signal 430, and a second correction circuit 445 connected to the odd sampler 425 adds a second DC offset correction signal 415 and a second DFE signal 435.

For a DDR receiver, a coupled half-rate clock may appear as a DC offset for the even and odd samplers. The respective DC offsets at the two samplers may differ. For example, if a sinusoid at frequency $f_0$ is sampled with both positive and negative edges of a half-rate clock, each set of samples—the set sampled with the positive edge and the set sampled with the negative edge—may be a respective one of two constants, the two constants having different signs.

In one embodiment, a modification to the LMS adaptation algorithm may be used to cancel the effect of coupled clock on the signal, in addition to mitigating post-cursor ISI. Equation (2) may be written as:

$$y_n = [x_n x_{n-1} x_{n-2} 1] \otimes [h_0 h_1 h_2 b] + \text{noise}. \quad (4)$$

Consequently, the adaptation algorithm of equation (3) may be modified, and an algorithm using the following iterative equation may be used to calculate DFE taps and an estimate of the offset:

$$[h_0 h_1 h_2 b]\hat{}_k = [h_0 h_1 h_2 b]\hat{}_{k-1} + \mu * \text{sign}([x_n x_{n-1} x_{n-2} 1]) * \text{sign}(\text{error}_n) \quad (5)$$

where "$\text{error}_n$" is the difference between the received signal $y_n$ and the reconstructed signal $[x_n x_{n-1} x_{n-2} 1] \otimes [h_0 h_1 h_2 b]\hat{}_{k-1}$. In this modified equation, the estimated DC offset $b\hat{}$ has been included in the parameter vector, and the constant 1 has been included in the data vector.

Figure 5:
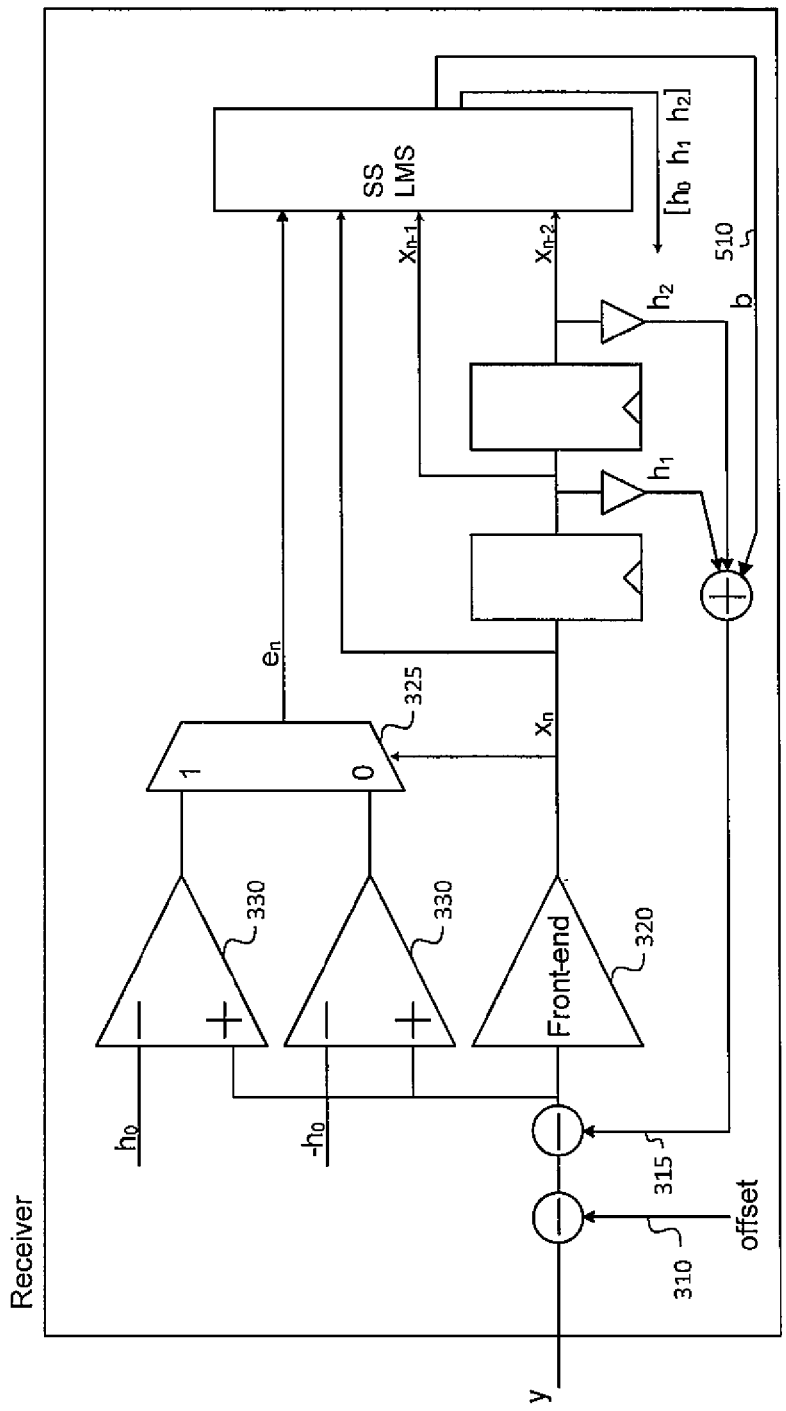
FIG. 5 is a schematic diagram of a serial receiver with offset correction, DFE, and adaptive adjustment of DFE taps and of the offset correction, according to an embodiment of the present invention.

Referring to FIG. 5, in one embodiment this modification is implemented by the DC offset connection 510, adding the value $b\hat{}$ to the DFE signal 315. The value $b\hat{}$, like the DFE taps, is iteratively updated. In one embodiment, the value of b is updated using the SS LMS algorithm; in other embodiments, another adaptive algorithm, different from SS LMS, may be used.

In embodiments using DDR, the coupled clock may have a frequency of one-half the bit rate, i.e., $f_0=1/(2T)$. When $f_0=\frac{1}{2}T$, $\cos(2*pi*f_0*nT+\Phi)=\cos(pi*n+\Phi)=\pm b$. A DDR receiver may include two samplers, one sampling at the positive edges of a half-rate clock and the other at the negative edges of the half-rate clock. For one of these two samplers, the offset introduced by the clock coupling is +b while for the other sampler, it is −b.

For n an even time index, $$y_n = [x_n x_{n-1} x_{n-2}] \otimes [h_0 h_1 h_2] + b_e + \text{noise} \quad (6)$$

and, for $n$ an odd time index, $$y_n = [x_n x_{n-1} x_{n-2}] \otimes [h_0 h_1 h_2] + b_0 + \text{noise} \quad (7)$$

where, nominally, $b_e = -b_o$.

Consequently, the adaptation (5) algorithm can be modified to:

$$[h_0 h_1 h_2 b_e]\hat{}_k = [h_0 h_1 h_2 b_e]\hat{}_{k-1} + \mu * \text{sign}([x_n x_{n-1} x_{n-2} 1]) * \text{sign}(\text{error}_n),$$

with $$\text{error}_n = y_n - [x_n x_{n-1} x_{n-2} 1] \otimes [h_0 h_1 h_2 b_e]\hat{}_{k-1},$$

for $n$ even, and $$[h_0 h_1 h_2 b_o]\hat{}\ k = [h_0 h_1 h_2 b_o]\hat{}\ _{k-1} + \mu * \text{sign}([x_n x_{n-1} x_{n-2} 1])$$
$$* \text{sign}(\text{error}_n),$$

with $$\text{error}_n = y_n - [x_n x_{n-1} x_{n-2} 1] \otimes [h_0 h_1 h_2 b_o]\hat{}\ _{k-1},$$

for n odd.

As such, while the DFE taps may be adapted whether the bit-index is even or odd, the DC offset estimate for the even slicer is only adapted when the bit-index is even, and the DC offset estimate for the odd slicer is only adapted when the bit-index is odd. Referring again to FIG. 4, in one embodiment a processing unit (not shown in FIG. 4), executing, e.g., an SS LMS algorithm, controls the DFE signal channel taps, in a manner analogous to that shown in FIGS. 3 and 5. As in the embodiment of FIG. 5, the LMS algorithm executing for the receiver of FIG. 4 may be modified to generate two estimated DC offsets $b_e\hat{}$ and $b_o\hat{}$, one for the first sampler 420, and one for the second sampler 425, respectively.

Figure 6:
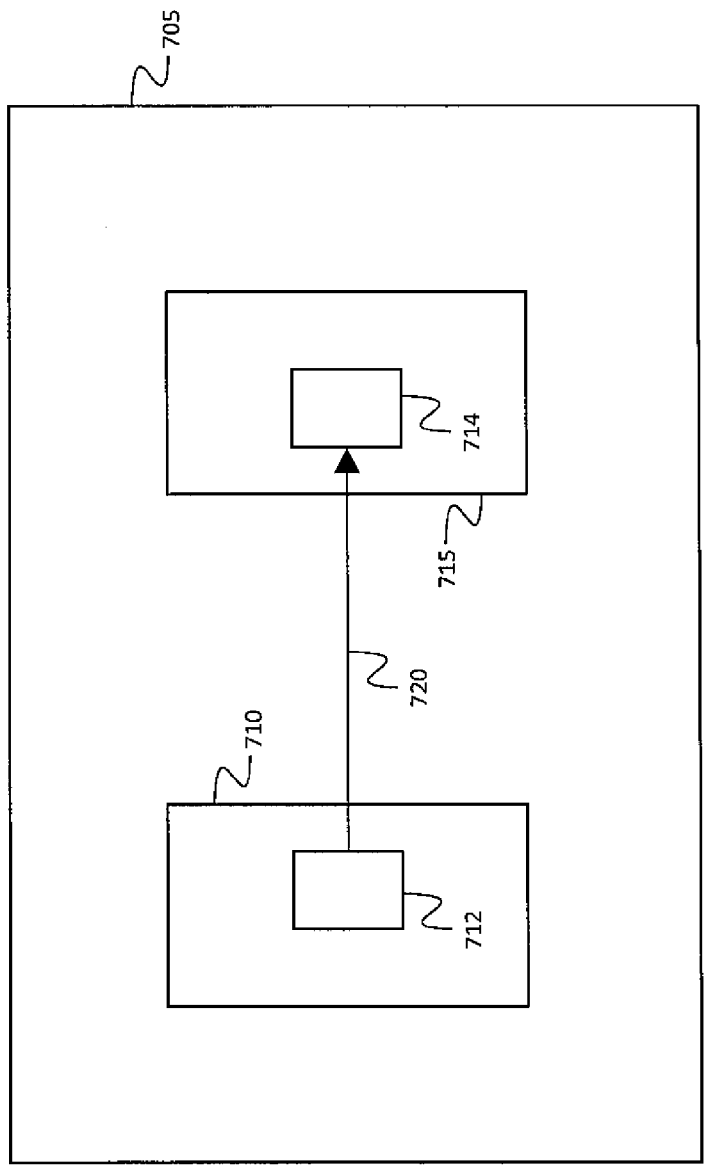
FIG. 6 is a block diagram of a display, according to an embodiment of the present invention.

Referring to FIG. 6, in one embodiment, a display 705 contains a timing controller 710 including a serial transmitter 712 configured to send high-speed digital data to a serial receiver 714 in a driver integrated circuit (driver IC) 715, over a non-ideal (e.g., lossy) channel 720. The receiver 714 receives a signal that is affected by inter-symbol interference and by a DC offset. The receiver 714 includes a system for DC offset correction according to an embodiment of the present invention. Here, in embodiments of the present invention, the display is an organic light emitting diode (OLED) display or a liquid crystal display (LCD).

It will be understood that as used herein, the term "DC offset" is not limited to a strictly constant value but may be a slowly varying value, changing for example as the temperature or other conditions of the serial link change.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

The electronic or electric devices and/or any other relevant devices or components of a display according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

The term "processing unit" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing unit, as used herein, each function is performed either by hardware configured, i.e., hard-wired, to perform that function, or by more general purpose hardware, such as a CPU, configured to execute instructions stored in a non-transitory storage medium. A processing unit may be fabricated on a single printed circuit board (PCB) or distributed over several interconnected PCBs. A processing unit may contain other processing units; for example a processing unit may include two processing units, an FPGA and a CPU, interconnected on a PCB.

Although exemplary embodiments of a system and method for adaptive cyclic offset cancellation for the receiver front-end of high-speed serial links have been specifically described and illustrated herein, many modifications and variations will be apparent to those skilled in the art. Accordingly, it is to be understood that a system and method for adaptive cyclic offset cancellation for the receiver front-end of high-speed serial links constructed or practiced according to principles of this invention may be embodied other than as specifically described herein. The invention is also defined in the following claims, and equivalents thereof.

What is claimed is:

1. A receiver for a serial link, the receiver having an analog input configured to receive a received signal and comprising:
a first front end comprising a first sampler configured to sample a signal at an input of the first front end;
a first correction circuit configured to add a first correction to the signal at the input of the first front end, the first correction including a first offset correction; and
a processing unit configured to calculate the first offset correction, the calculating comprising iteratively updating a first parameter vector including the first offset correction, the updating comprising adding to the first parameter vector a first adjustment equal to the product of:
a constant step size;
a first function of a data vector; and
a second function of a first error value;
the data vector including:
a plurality of previously received bits, and
the value 1;
the first error value being equal to the difference between the received signal and a first reconstructed signal,
the first reconstructed signal being a sum of an element by element product of:
the data vector, and
the first parameter vector.

2. The receiver of claim 1, wherein the data vector includes the value 1 at a position corresponding to the position in the first parameter vector of the first offset correction.

3. The receiver of claim 1, wherein the first function is a sign function, and the second function is a sign function.

4. The receiver of claim 1, wherein the first function is an identity function, and the second function is a sign function.

5. The receiver of claim 1, wherein the first function is a sign function, and the second function is an identity function.

6. The receiver of claim 1, wherein the correction further includes a decision feedback equalizer (DFE) signal.

7. The receiver of claim 6, wherein the DFE signal includes a sum of an element by element product of:
a vector of previously received bits and
a vector of DFE taps.

8. The receiver of claim 1, further comprising:
a second front end comprising a second sampler configured to sample a signal at an input of the second front end; and
a second correction circuit configured to add a second correction to the signal at the input of the second front end, the second correction including a second offset correction,
wherein the processing unit is further configured to calculate the second offset correction, the calculating comprising iteratively updating a second parameter vector including the second offset correction, the updating comprising adding to the second parameter vector a second adjustment equal to the product of:
the constant step size;
a first function of the data vector; and
a second function of a second error value;
the second error value being equal to the difference between the received signal and a second reconstructed signal,
the second reconstructed signal being a sum of an element by element product of:
the data vector, and
the second parameter vector.

9. The receiver of claim 1, wherein the data vector includes the value 1 at a position corresponding to the position in the first parameter vector of the first offset correction.

10. The receiver of claim 1, wherein the first function is a sign function, and the second function is a sign function.

11. The receiver of claim 1, wherein the first function is an identity function, and the second function is a sign function.

12. The receiver of claim 1, wherein the first function is a sign function, and the second function is an identity function.

13. The receiver of claim 1, wherein the correction further includes a decision feedback equalizer (DFE) signal.

14. The receiver of claim 13, wherein the DFE signal includes the sum of an element by element product of:

a vector of previously received bits, and
a vector of DFE taps.

15. A display comprising:
a timing controller comprising a serial transmitter; and
a driver integrated circuit comprising a serial receiver connected to the serial transmitter by a serial channel,
the receiver having an analog input configured to receive a received signal and comprising:
   a first front end comprising a first sampler configured to sample a signal at an input of the first front end;
   a first correction circuit configured to add a first correction to the signal at the input of the first front end, the first correction including a first offset correction; and
   a processing unit configured to calculate the first offset correction, the calculating comprising iteratively updating a first parameter vector including the first offset correction, the updating comprising adding to the first parameter vector a first adjustment equal to a product of:
      a constant step size;
      a first function of a data vector; and
      a second function of a first error value;
the data vector including:
   a plurality of previously received bits, and
   the value 1;
the first error value being equal to the difference between the received signal and a first reconstructed signal,
the first reconstructed signal being a sum of an element by element product of:
   the data vector, and
   the first parameter vector.

16. The receiver of claim 15, wherein the data vector includes the value 1 at a position corresponding to the position in the first parameter vector of the first offset correction.

17. The receiver of claim 15, wherein the first function is a sign function, and the second function is a sign function.

18. The receiver of claim 15, wherein the correction further includes a decision feedback equalizer (DFE) signal.

19. The receiver of claim 15, wherein the correction further includes a decision feedback equalizer (DFE) signal, and wherein the DFE signal includes the sum of an element by element product of:
   a vector of previously received bits, and
   a vector of DFE taps.

20. A display comprising:
a timing controller comprising a serial transmitter; and
a driver integrated circuit comprising a serial receiver connected to the serial transmitter by a serial channel,
the receiver having an analog input configured to receive a received signal and comprising:
   a first front end comprising a first sampler configured to sample a signal at an input of the first front end;
   a first correction circuit configured to add a first correction to the signal at the input of the first front end, the first correction including a first offset correction; and
   a processing unit for calculating the first offset correction, the calculating comprising iteratively updating a first parameter vector including the first offset correction, the updating comprising adding to the first parameter vector a first adjustment equal to a product of:
      a constant step size;
      a first function of a data vector; and
      a second function of a first error value;
the data vector including:
   a plurality of previously received bits, and
   the value 1;
the first error value being equal to the difference between the received signal and a first reconstructed signal,
the first reconstructed signal being a sum of an element by element product of:
   the data vector, and
   the first parameter vector.

* * * * *